United States Patent
Krueger et al.

(10) Patent No.: US 6,831,578 B2
(45) Date of Patent: Dec. 14, 2004

(54) METHOD AND CIRCUIT ARRANGEMENT FOR DEMODULATION OF A QUADRATURE AMPLITUDE- OR PHASE-MODULATED SIGNAL

(75) Inventors: Martin Krueger, München (DE); Heinrich Schenk, München (DE); Andreas Wiesbauer, Poertschach (AT)

(73) Assignee: Infineon Technologies, AG, Munich (DE)

( * ) Notice: Subject to any disclaimer, the term of this patent is extended or adjusted under 35 U.S.C. 154(b) by 67 days.

(21) Appl. No.: 10/203,439

(22) PCT Filed: Feb. 5, 2001

(86) PCT No.: PCT/EP01/01198

§ 371 (c)(1),
(2), (4) Date: Oct. 21, 2002

(87) PCT Pub. No.: WO01/60007

PCT Pub. Date: Aug. 16, 2001

(65) Prior Publication Data

US 2004/0125892 A1 Jul. 1, 2004

(30) Foreign Application Priority Data

Feb. 8, 2000 (DE) .................................. 100 05 497

(51) Int. Cl.[7] .................................................. H03M 3/00
(52) U.S. Cl. ................................................ 341/143; 341/155
(58) Field of Search ............................... 341/155, 143; 329/304, 327

(56) References Cited

U.S. PATENT DOCUMENTS

| | | | |
|---|---|---|---|
| 4,737,728 A | | 4/1988 | Nakamura et al. |
| 5,172,070 A | | 12/1992 | Hiraiwa et al. |
| 5,515,400 A | * | 5/1996 | Arai ............................ 375/261 |
| 5,535,245 A | * | 7/1996 | Kim ............................ 375/261 |
| 5,696,796 A | | 12/1997 | Poklemba |
| 5,926,065 A | | 7/1999 | Wakai et al. |

FOREIGN PATENT DOCUMENTS

| | | |
|---|---|---|
| DE | 3733967 A1 | 10/1987 |
| DE | 3733967 C2 | 10/1987 |
| DE | 3938126 A1 | 11/1989 |
| DE | 68923857 T2 | 12/1989 |
| DE | 19538002 C2 | 10/1995 |
| DE | 19802373 C1 | 1/1998 |
| FR | 98 08431 | 6/1998 |

OTHER PUBLICATIONS

"*Pulstechnik*", Hölzler/Holzwarth, vol. 2, 2$^{nd}$ edition, 1984, p. 32 and 33.
"*Digitale Fernsehtechnik*", Ulrich Reimers, 2$^{nd}$ edition, 1997, p. 215–218.
"*Architektur eines Mobilfunkgerätes für das Netz D*", Schöffel et al, Philips Innovation Jan. 1991, p. 132–139.
"*Practical Digital Complex Sampling Scheme*", Electronics Letters, 28$^{th}$ Feb. 1991, vol. 27, No. 5, p 460–462.

\* cited by examiner

Primary Examiner—Jean Bruner Jeanglaude
(74) Attorney, Agent, or Firm—Holme Roberts & Owen LLP

(57) ABSTRACT

For digital demodulation of a quadrature amplitude- or phase-modulated signal ($x_E(t)$), this is sampled with a sampling frequency $f_s$ and A/D converted, which has the relationship $$f_s = \frac{4 \cdot f_0}{1 + 2 \cdot \lambda}$$

with the carrier frequency $f_0$, whereby $\lambda$ is a whole number greater than or equal to zero. The multiplications of the sampled and A/D converted quadrature amplitude- or phase-modulated signal usually necessary for demodulation, with the signal $$\cos\left(2 \cdot \pi \cdot \frac{f_0}{f_s} \cdot k\right)$$

and the signal $$\sin\left(2 \cdot \pi \cdot \frac{f_0}{f_s} \cdot k\right)$$

can be easily performed, whereby the individual sample values of the quadrature amplitude- or phase-modulated signal are multiplied by the value −1, 0 or 1.

17 Claims, 4 Drawing Sheets

| k | λ=0 | | λ=1 | | λ=2 | |
|---|---|---|---|---|---|---|
| | cos(...) | sin(...) | cos(...) | sin(...) | cos(...) | sin(...) |
| 0 | 1 | 0 | 1 | 0 | 1 | 0 |
| 1 | 0 | 1 | 0 | -1 | 0 | 1 |
| 2 | -1 | 0 | -1 | 0 | -1 | 0 |
| 3 | 0 | -1 | 0 | 1 | 0 | -1 |
| 4 | 1 | 0 | 1 | 0 | 1 | 0 |
| 5 | 0 | 1 | 0 | -1 | 0 | 1 |
| 6 | -1 | 0 | -1 | 0 | -1 | 0 |
| 7 | 0 | -1 | 0 | 1 | 0 | -1 |

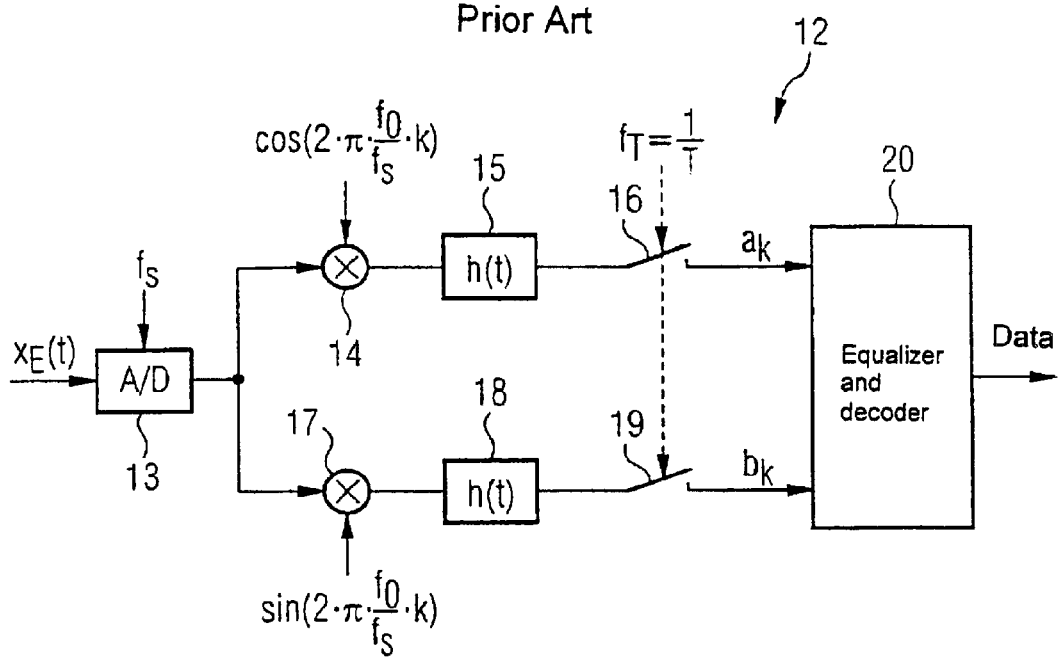

METHOD AND CIRCUIT ARRANGEMENT FOR DEMODULATION OF A QUADRATURE AMPLITUDE- OR PHASE-MODULATED SIGNAL

CROSS REFERENCE TO RELATED APPLICATIONS

This application is a 371 of PCT/EP01/01198, filed Feb. 5, 2001, and claims priority to German Application 100 05 497.8 filed Feb. 8, 2000.

BACKGROUND OF THE INVENTION

(1) Field of the Invention

The present invention relates to a method according to the preamble of claim 1 to demodulate a quadrature amplitude- or phase-modulated i.e. phase shift keyed signal as well as a corresponding circuit arrangement according to the preamble of claim 8.

(2) Description of Related Art

The present broadband cable network, which serves to transmit analog TV signals, will in future also be used to transmit digital TV channels. Furthermore it will also serve as a transmission medium for interactive services, such as in particular internet applications. This demands that digital data must be transmitted via the broadband cable network instead of analog TV signals. In addition for interactive services a feedback channel must be made available, by means of which digital data can be sent back by the individual subscriber.

According to the current state of standardization for digital broadband cable networks for the outward channel, that is to say the transmission direction from the exchange or the so-called "head end" of the broadband cable network to a subscriber (so-called "downstream" direction), a transmission frequency range of between approx. 90 MHz and 800 MHz is specified, while for the feedback channel, that is to say the transmission direction from a subscriber to the exchange (so-called "upstream" direction), a transmission frequency range of between approx. 5 MHz and 65 MHz is specified. In addition for data transmission the so-called quadrature amplitude modulation (QAM) is specified as type of modulation.

Quadrature amplitude modulation is an expansion of digital phase modulation or phase shift keying. Generally with phase shift keying the phase of the carrier signal is changed over between several discrete stages depending on the data symbol being transmitted. While in the case of pure phase shift keying a data symbol being sent is only transmitted in the form of carrier phase information modulated up to a carrier signal, with quadrature amplitude modulation N=1d(M) data bits are combined and transmitted in the form of carrier amplitude information and carrier phase information, where M describes the number of the different carrier states which can be transmitted.

The structure of a typical QAM modulator is illustrated in FIG. 4. The binary data being transmitted are firstly combined into groups with aid of an encoder 1 and in each case allocated to a value pair $(a_k, b_k)$.

The number M of available value pairs exactly defines the type of modulation. The available value pairs can be represented in a 2-dimensional a/b graph, the so-called signal space. If only value pairs, which lie in the a/b-graph on the unit circle are used, pure phase shift keying is the case. If for example only the value pairs (1,1), (1,−1), (−1, 1) and (−1, −1) are used, the corresponding modulation is described as 4PSK modulation. If on the other hand the value pairs in the a/b-graph have different amplitude stages, quadrature amplitude modulation is the case.

As an example the signal space situation or the a/b-graph for 64 stage quadrature amplitude modulation is illustrated in FIG. 5A, while in FIG. 5B the signal space situation for 16 stage quadrature amplitude modulation is shown.

The values $a_k$ and $b_k$ of the value pair generated with the encoder 1 depending on the data being transmitted are then sampled in two separate signal paths with the aid of samplers 2 or 5, connected with a sampling frequency $f_t=1/T$ also described as symbol rate, to the inputs of two identical digital low-pass-filters 3 or 6, which have the transmission function g(t), and with the aid of multipliers or modulators 4 or 7 are multiplied by the carrier oscillations $\cos(2\cdot\pi\cdot f_0\cdot t)$ or $\sin(2\cdot\pi\cdot f_0\cdot t)$ orthogonal to each other. At the output end the two part signals resulting from this are added using an adder 8 and transmitted to a receiver in the form of a quadrature amplitude-modulated transmitted signal $x_s(t)$ via a transmission channel, in the case of a broadband cable network via a broadband-coaxial cable.

From the receiver the received signal must be demodulated coherently with the modulation shown in FIG. 4. Pure digital construction of the demodulator however is not possible on account of the relatively high transmission frequency range of approx. 90 MHz . . . 800 MHz in the case of downstream data transmission.

As is shown in FIG. 6 by way of a typical cable modem receiver, the quadrature amplitude-modulated received signal $x_E(t)$ in the receiver is therefore brought using a normal commercial tuner 9 or frequency mixer and a variable mix frequency fm1 into an intermediate frequency position, as is also normal for example in the case of analog TV reception. The intermediate frequency in Europe is normally 36 MHz and in the USA 44 MHz. Subsequently the received signal is fed via a bandpass filter 10 to a further frequency mixer 11, which shifts the received signal $x_E(t)$ lying initially in the intermediate frequency range mentioned dependent on a further (permanent) combination frequency fm2 into a frequency range of approx. 8 MHz . . . 15 MHz. Then the received signal $x_E(t)$ is fed to a digital demodulator 12 for demodulation. Equally it is conceivable that the received signal $x_E(t)$ is fed without further frequency shift to the digital demodulator 12, which is described as "direct conversion".

The structure of the actual digital demodulator 12 according to prior art is shown in FIG. 7.

As already mentioned, demodulation takes place coherently with the modulation shown in FIG. 4. The quadrature amplitude- or phase-modulated received signal $x_E(t)$ is first fed to an analog/digital-converter 13, which samples the received signal with a sampling frequency fs. Then the received signal digitalised in this way is fed to two signal paths, where it is multiplied with the aid of multipliers 14 or 17 by the two carrier oscillations $$\cos\left(2\cdot\pi\cdot\frac{f_0}{f_s}\cdot k\right)$$

or $$\cos\left(2\cdot\pi\cdot\frac{f_0}{f_s}\cdot k\right)$$

orthogonal to each other. Subsequently with the aid of digital filters 15 or 18, which have the transmission function h(t), low-pass filtering of the two received signal components takes place, in order to filter out or suppress spurious signal components in the case of the doubled carrier frequency as well as interfering components of adjacent frequency bands. With the aid of samplers 16 or 19, which work at least with a sampling frequency $f_T=1/T$ corresponding to the symbol rate, the components of the value pairs ($a_k$, $b_k$) corresponding to the particular sample value of the received signal $x_E(t)$ are retrieved and finally fed to an equalizer and decoder 20, which by way of a decoding ruling corresponding to the type of modulation used in each case calculates and emits the original binary data.

In the case of the demodulator arrangement shown in FIG. 7 however the relatively high signal processing complexity, which is necessary to produce the cosine- and sine values of the carrier oscillations and for multiplying by the carrier oscillations and for subsequent digital filtering, is disadvantageous, whereby this problem not only concerns quadrature amplitude-modulation, but all types of phase modulation or phase shift keying.

BRIEF SUMMARY OF THE INVENTION

The present invention is therefore based on the objective of proposing a method and a corresponding circuit arrangement for demodulation of a quadrature amplitude- or phase-modulated signal, whereby the signal processing complexity is reduced.

This objective is achieved according to the invention by a method with the features of claim 1 or a circuit arrangement with the features of claim 6. The sub-claims in each case define advantageous and preferred embodiments of the present invention.

According to the invention a sampling frequency $f_s$, which has the following relationship:

$$f_s = \frac{4 \cdot f_0}{1 + 2 \cdot \lambda}$$

with the carrier frequency $f_o$ of the quadrature amplitude- or phase-modulated signal is selected for demodulation. For multiplications to be performed in the cosine- or sine-signal path of the demodulator considerably less constructional complexity results since the particular sampling signal of the quadrature amplitude or phase-modulated signal only has to be multiplied by the value −1, 0 or 1.

Further simplification results if the individual sample values of the quadrature amplitude- or phase-modulated signal are split with the aid of corresponding switchover directly into the two signal paths, whereby the switchover is performed according to the sampling frequency fs. The sampling rate of the two signal paths can therefore be halved, related to the sampling frequency of the analog/digital-converter at the input end. Before low-pass filtering, the sample values in the two signal paths must be multiplied alternately by +1 or −1. The sampling frequency has a major influence on complexity of construction. The higher the sampling frequency, the greater the computing complexity necessary for demodulation.

As a result of the reduction described above of the sampling rate in the two signal paths complexity of construction can therefore be reduced.

The function of the analog/digital-converter at the input end can be split into two analog/digital-converter-stages, whereby the first stage only produce the high value bits of the individual sample values, while the second stage, which is designed in each case using a analog/digital-converter in each of the two signal paths, which generate the low value bits of the sample values.

The invention can be used in a receiver with "direct conversion" or "direct first intermediate sampling" as well as in a receiver with a second analog mixing stage (see FIG. 6).

The invention for example is suitable for use in a digital demodulator for QAM-signals, as for example it can find application in a digital receiver for broadband cable networks. The invention however is not limited to this field of use, but generally can be employed to demodulate quadrature amplitude- or phase-modulated i.e. phase-shift keyed signals.

BRIEF DESCRIPTION OF THE SEVERAL VIEWS OF THE DRAWINGS

The invention is explained in more detail below by way of a preferred embodiment with reference to the attached drawing.

FIG. 7 shows a simplified block circuit diagram of a digital demodulator according to the prior art.

DETAILED DESCRIPTION OF THE INVENTION

An example of the present invention will be explained below by way of a digital QAM-demodulator, as used for example in a broadband cable network in a downstream-receiver, that is to say receiver allocated to a subscriber.

As described by way of FIG. 7 for the digital demodulator according to the prior art, the received signal $x_E(t)$ sampled with the sampling frequency $f_s$ is multiplied in a first signal path (the cosine-signal path) with $$\cos\left(2 \cdot \pi \cdot \frac{f_0}{f_s} \cdot k\right)$$

and in a second signal path (the sine-signal path) with $$\sin\left(2 \cdot \pi \cdot \frac{f_0}{f_s} \cdot k\right),$$

whereby $f_0$ describes the frequency of the intermediate frequency-carrier signal (IF carrier signal) and k the time parameter or sampling index (k=0, 1, 2, ... ). A considerable reduction in complexity of construction regarding the digital demodulator can be achieved if the sampling frequency $f_s$ is selected, so that the values for the carrier oscillations disappear at regular intervals.

This is true in particular if the sampling frequency $$f_s = \frac{4 \cdot f_0}{1 + 2 \cdot \lambda}$$

is selected where λ=0, 1, 2, . . . . For the argument of the carrier oscillations the expression $$\left( \pi \cdot \frac{1 + 2 \cdot \lambda}{2} \cdot k \right)$$

then results.

Figures 1, 2:
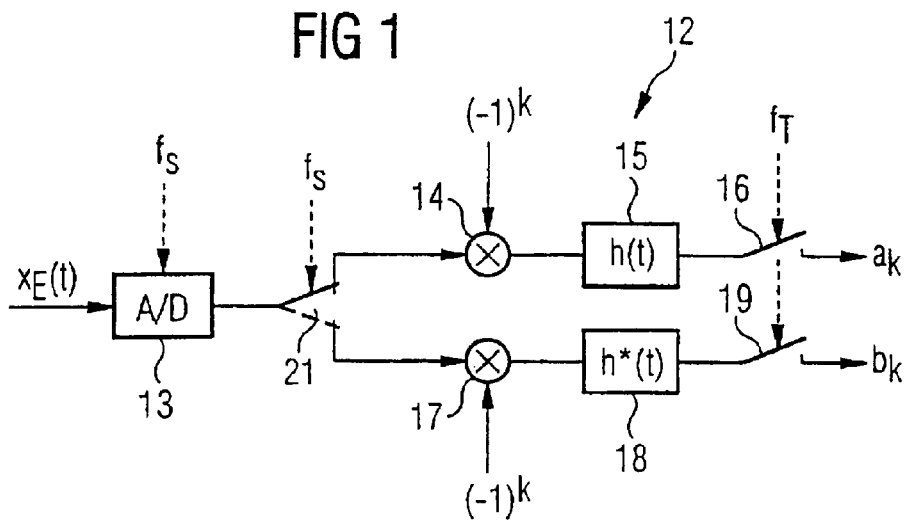
FIG. 1 shows a simplified block circuit diagram of a digital demodulator according to a first embodiment of the present invention.
FIG. 2 shows a table to explain the method of functioning of the digital demodulator shown in FIG. 1.

A table is reproduced in FIG. 2, where the cosine and sine values are shown with different values for k and λ. From FIG. 2 it is clear that only the values −1, 0 and 1 appear for the cosine and sine values.

Furthermore it is clear from FIG. 2 that at each sampling time point k only either the cosine value or the sine value is different from zero. In addition a cosine value and a directly consecutive sine value (in FIG. 2 for λ=0 and λ=2) or a sine value and a directly consecutive cosine value (in FIG. 2 for λ=1) is always identical. This fact can be used in order to halve the sampling rate in the cosine-signal path and the sine-signal path in contrast to the sampling frequency of the analog/digital-conversion at the input end, since the sample values of the received signal can be split directly into the two signal branches and subsequently have to multiplied in the two signal paths before low-pass filtering only alternately with +1 and −1.

A corresponding digital demodulator is shown in FIG. 1.

The received signal $x_E(t)$ is firstly sampled and digitalized with the aid of an analog/digital-converter 13 with a particular sampling frequency $f_s$, whereby the sampling frequency $f_s$ in relation to the carrier frequency $f_o$ fulfils the equation $$f_s = \frac{4 \cdot f_0}{1 + 2 \cdot \lambda}$$

where λ=0, 1, 2 . . . A change-over switch 21, which is also operated with the frequency $f_s$, feeds the sample values of the received signal $x_E(t)$ supplied by the analog/digital-converter alternately to the cosine signal path and the sine signal path.

The sample values therefore in each case present in the two signal paths with the half sampling frequency are evaluated alternately in time with 1 and −1, dependent on the value of the sampling index k with the aid of multipliers 14 or 17, which is indicated in FIG. 1 by the multiplication factor $(-1)^k$. The intermediate signals resulting from this are fed to digital low-pass filters 15 or 18, which possess the transmission function h(t) or h*(t).

In the case of simultaneous processing of the cosine and sinus signal paths with the sampling frequency reduced in each case, a time shift by a scanning period, that is to say by the value $1/f_s$, must be considered in the sine signal path by interpolation. This interpolation can be performed by suitable dimensioning of the two digital low-pass filter without increasing signal processing complexity. The digital low-pass filters 15 or 18 used according to FIG. 1 therefore have an identical absolute value progression and are only differentiated through a constant group delay time of $1/f_s$. The two low-pass filters 15 and 18 are preferably designed in the form of linear-phased non-recursive-digital filters.

The demodulated part signals are sampled at the end of the two signal paths using samplers 16 or 19 with the symbol rate $f_T$, which normally corresponds to the sampling frequency $f_s$. The values for $a_k$ or $b_k$ obtained in this way and corresponding to the particular sample value of the received signal $x_E(t)$ are fed to a (not shown in FIG. 1) suitable equalizer and decoder (see FIG. 7), in order to retrieve the transmitted symbols corresponding to the particular sample value of the received signal $x_E(t)$ or the value pair $(a_k, b_k)$. By using a so-called "fractional spaced equalizer", for example a T/2-equalizer, the demodulated part signals however must be generated and made available at least with the doubled symbol rate.

Analog/digital-converters, which work with a high sampling frequency, can be designed with two-stages, whereby the first stage samples the particular analog signal with the nominal sampling frequency and only produces the high value bits of the individual amplitude values or sample values (coarse-resolution), while the second stage shifted in time with the aid of two part systems, which in each case work with the half nominal sampling frequency, generates the low value bits of the individual amplitude values (fine resolution). With a selector the digital data cycle can then be composed of the part data-cycles of the two part systems.

Figure 3:
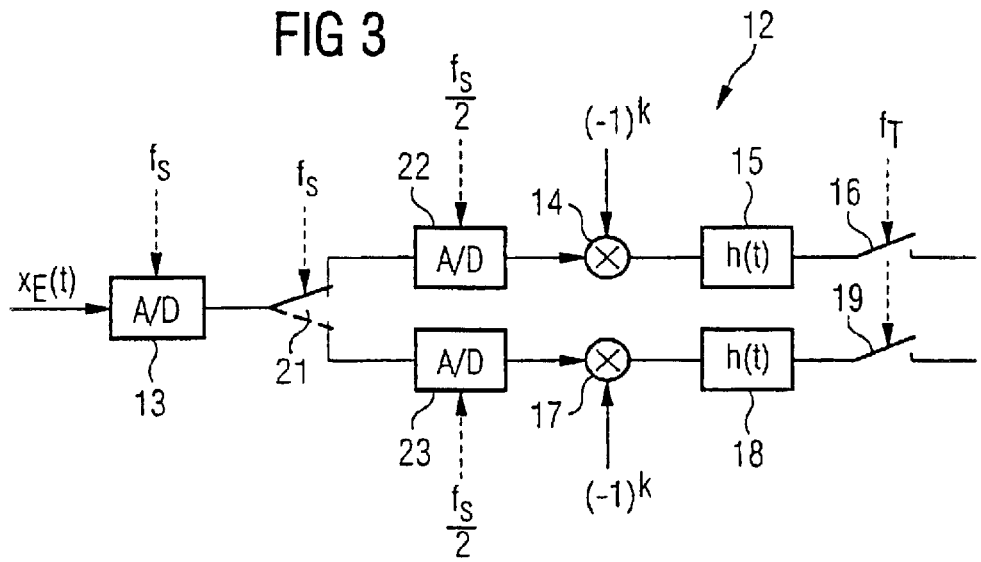
FIG. 3 shows a simplified block circuit diagram of a digital demodulator according to a second embodiment of the present invention.
Figure 4:
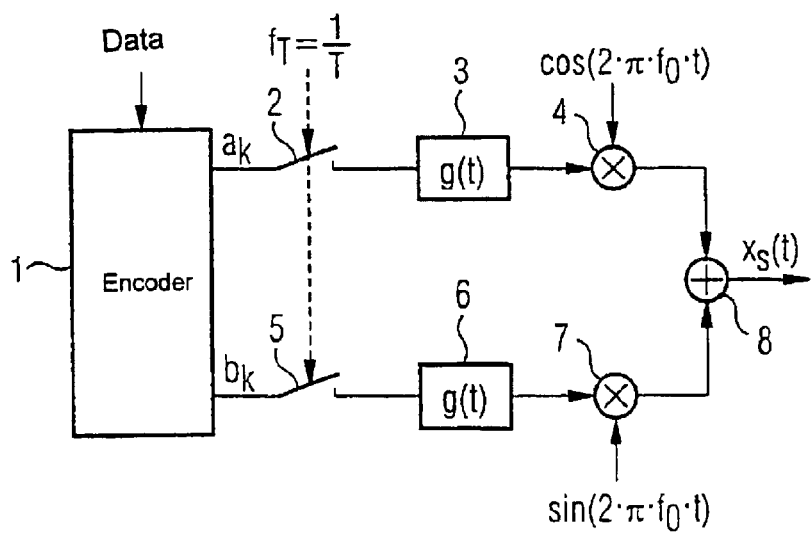
FIG. 4 shows a simplified block circuit diagram of a QAM modulator according to the prior art.
Figure 5:
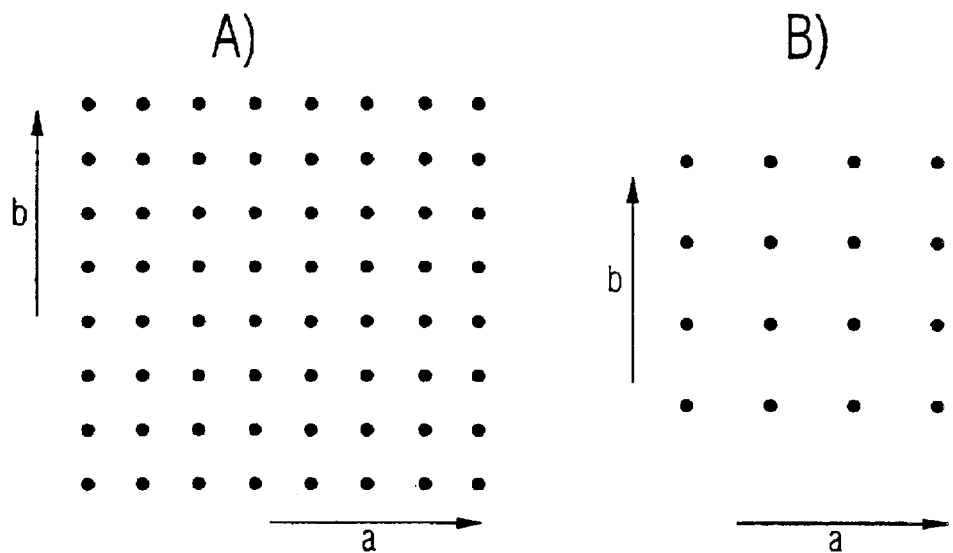
FIG. 5A or 5B shows the signal space situation for 64 stage or 16 stage quadrature amplitude modulation.
Figure 6:
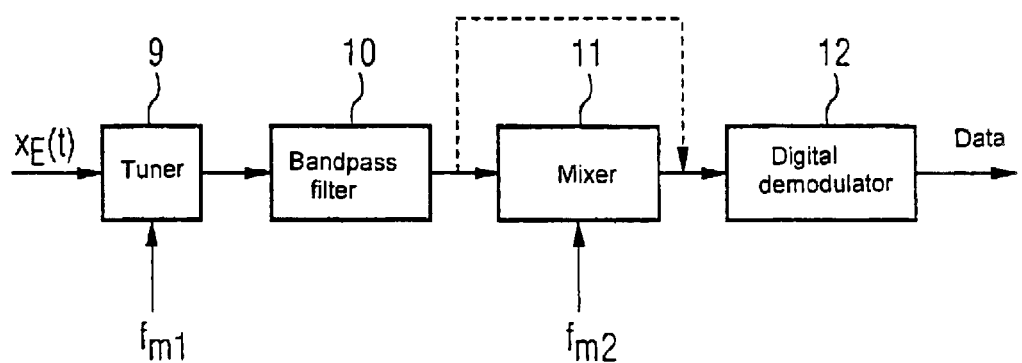
FIG. 6 shows a pre-stage of a digital demodulator, as used for example in a cable modem receiver.

This principle is used in the embodiment shown in FIG. 3. The analog/digital-converter samples the analog received signal with the sampling frequency $f_s$ and only produces the high value bits of the individual amplitude values. In each case further analog/digital-converters 22 or 23 are arranged in the cosine and sine signal path, which sample the output signal of the analog/digital-converter 13 time-shifted with the half sampling frequency $f_s/2$ and generate the low value bits of the individual amplitude values.

What is claimed is:

1. A method to demodulate a quadrature amplitude- or phase-modulated signal, comprising the steps of:

a) sampling and analog/digital-conversion of the quadrature amplitude- or phase-modulated signal ($x_E(t)$), which is present with a carrier frequency $f_o$, with a sampling frequency $f_s$, b) multiplying the signal sampled and digitalised in step a) in a first signal path with the signal $\cos(2 \cdot \pi \cdot f_0 \cdot t)$, in order to obtain a first digital intermediate signal, and in a second signal path with the signal $\sin(2 \cdot \pi \cdot f_0 \cdot t)$, in order to obtain a second digital intermediate signal, whereby k describes a sampling index where k=0,1,2; and c) sampling the first and second digital intermediate signals obtained in step b), in order in each case to determine the binary symbol values corresponding to the sample value of the quadrature amplitude- or phase-modulated signal ($x_E(t)$) by evaluating the sample values of the first and second digital intermediate signal obtained in this way in step a);

wherein in step a) the sampling frequency is $$f_s = \frac{4 \cdot f_0}{1 + 2 \cdot \lambda};$$

wherein λ is a whole number greater than or equal to zero, and that in step b) multiplication with the signal $$\cos\left( 2 \cdot \pi \cdot \frac{f_0}{f_s} \cdot k \right)$$

and multiplication with the signal $$\sin\left(2\cdot\pi\cdot\frac{f_0}{f_s}\cdot k\right)$$

is carried out by the fact that the sample value obtained in step a) of the quadrature amplitude- or phase-modulated signal ($x_E$(t)) dependent on the sampling index k is multiplied by the value −1, 0 or 1.

wherein the analog/digital-conversion of the quadrature amplitude- or phase-modulated signal (x(t)) is split into a first analog/digital-conversion, which is carried out before the first and second signal path and a second analog/conversion in each case carried out in the first and second signal path; and wherein with the first analog/digital-conversion, only the high value bits of the individual sample values of the quadrature amplitude- or phase-modulated signal ($x_E$(t)) are produced, while with the second analog/digital-conversions the low value bits of the individual sample values of the quadrature amplitudes or phase-modulated signal ($x_E$(t)) are produced.

2. A method according to claim 1, wherein in step b) the sampling value obtained in step a) of the quadrature amplitude- or phase-modulated signal ($x_E$(t)) corresponding to the sampling frequency $f_s$ is used in step a) is fed alternately to the first signal path and the second signal path and is multiplied there in each case dependent on the sampling index k by the value −1 or 1.

3. A method according to claim 2, wherein the first and second digital intermediate signals obtained in step b) before carrying out step c) in the first or second signal path undergo digital low-pass filtering, and wherein digital filters are used for this purpose, the frequency responses of which are differentiated by the group delay time 1/$f_s$.

4. A method according to claim 1, wherein the first and second digital intermediate signals obtained in step b) before carrying out step C) in the first or second signal path undergo digital low-pass filtering, and wherein digital filters are used for this purpose, the frequency responses of which are differentiated by the group delay time 1/$f_s$.

5. A method according to claim 4, wherein the digital filters used for digital low-pass-filtering are non-recursive digital filters.

6. A method according to claim 1, wherein in the sampling takes place in step c) with a frequency which is at least as great as the symbol rate ($f_T$) of the quadrature amplitude- or phase-modulated signal ($x_E$(t)).

7. A method according to claim 1, wherein the first analog/digital-conversion is performed with the sampling frequency $f_s$, while the second analog/digital-conversions are carried out with the sampling frequency $f_s$/2.

8. A method according to claim 1, wherein the method is used in a receiver connected to a broadband cable network for demodulation of a quadrature amplitude- or phase-modulated signal ($x_E$(t)) transmitted via the broadband cable network.

9. A method according to claim 8, wherein the method is used in the receiver for demodulation of the quadrature amplitude- or phase-modulated signal ($x_E$(t)) transmitted via the broadband cable network with the carrier frequency $f_o$ between 90 MHz and 800 MHz.

10. A circuit arrangement for demodulation of a quadrature amplitude- or phase-modulated signal, comprising an analog/digital-converter to scan and analog/digital-convert a quadrature amplitude- or phase-modulated signal ($x_E$(t)), which is present with a carrier frequency $f_o$, with a sampling frequency $f_s$, with a first signal path with a first multiplier (14) to multiply the sampled and digitalized quadrature amplitude- or phase-modulated signal with the signal $$\cos\left(2\cdot\pi\cdot\frac{f_0}{f_s}\cdot k\right),$$

whereby k describes a sampling index where k=0,1,2 ... ;

a first sampling device to scan the signal resulting from the analog/digital converter, and with a second signal path with a second multiplier to multiply the sampled and digitalized quadrature amplitude- or phase-modulated signal with the signal $$\sin\left(2\cdot\pi\cdot\frac{f_0}{f_s}\cdot k\right)$$

and a second sampling device to sample the signal resulting from this, and with a decoder device to evaluate the sample values produced by the first and second sampling device in order to determine binary symbol values corresponding to the particular sample value of the quadrature amplitude- or phase-modulated signal ($x_E$(t));

wherein for the sampling frequency $f_s$ of the analog/digital converter the equation $$f_s = \frac{4\cdot f_0}{1+2\cdot\lambda}$$

applies, wherein λ is a whole number greater than or equal to zero, wherein the first and second multiplier is designed in such a way that it carries out the multiplication with the signal $$\cos\left(2\cdot\pi\cdot\frac{f_0}{f_s}\cdot k\right)$$

or with the signal $$\sin\left(2\cdot\pi\cdot\frac{f_0}{f_s}\cdot k\right)$$

by the fact that the sample values of the quadrature amplitude- or phase-modulated signal ($x_E$,(t)) dependent on the sampling index given out by the analog/digital-convert are multiplied by the value −1, 0 or 1, characterised in that the analog/digital-converter is designed in such a way that it only produces the high value bits of the sample values of the quadrature amplitude- or phase-modulated signal ($x_E$(t));

wherein in each case a further analog-digital converter is allocated to the first signal path as well as the second signal path and precedes the first or second multiplier; and wherein the further analog/digital converters are designed in such a way that they produce the low value bits of the sample values of the quadrature amplitude- or phase-modulated signal ($x_E$(t)).

11. A circuit arrangement according to claim 10, wherein the analog/digital-converter is followed by a change-over device which feeds the sample values given out by the analog/digital-converter of the quadrature amplitude- or phase-modulated signal ($x_E(t)$) corresponding to the sampling frequency $f_s$ alternately to the first signal path and the second signal path; and wherein the first and second multiplier is designed in such a way that it carries out the multiplication with the signal $$\cos\left(2 \cdot \pi \cdot \frac{f_0}{f_s} \cdot k\right)$$

or with the signal $$\sin\left(2 \cdot \pi \cdot \frac{f_0}{f_s} \cdot k\right)$$

by the fact that it multiplies the sample values given out by the analog/digital-converter and fed via the change-over device of the quadrature amplitude- or phase-modulated signal ($x_E(t)$) dependent on the sampling index k by the value −1 or 1.

12. A circuit arrangement according to claim 11, wherein the first signal path includes a first digital low-pass filter for low-pass filtering of the digital output signal of the first multiplier, and the second signal path includes a second digital low-pass filter for low-pass filtering of the digital output signal of the second multiplier, wherein the frequency responses of the first low pass filter and the second low pass filter are differentiated by the group delay time $1/f_s$.

13. A circuit arrangement according to claim 10, wherein the first signal path includes a first digital low-pass filler for low-pass filtering of the digital output signal of the first multiplier, and the second signal path includes a second digital low-pass filter for low-pass filtering of the digital output signal of the second multiplier, wherein the frequency responses of the first low pass filter and the second low pass filter are differentiated by the group delay time $1/f_s$.

14. A circuit arrangement according to claim 13, wherein the first low-pass filter and the second low-pass flier are designed in the form of non-recursive digital filters.

15. A circuit arrangement according to claim 10, wherein the first sampling device allocated to the first signal path and the second sampling device allocated to the second signal path work with a sampling frequency, which is at least as great as the symbol rate ($f_T$) of the quadrature amplitude- or phase-modulated signal ($x_E(t)$).

16. A circuit arrangement according to claim 10, wherein the analog/digital-converter works with the sampling frequency $f_s$ while the further analog/digital converters work with the sampling frequency $f_s/2$.

17. A circuit arrangement according to claim 10, wherein a QAM-modulated signal ($x_E(t)$) is fed to the analog/digital-converter.

* * * * *